(12) United States Patent
Ghafoor

(10) Patent No.: US 6,618,587 B1
(45) Date of Patent: Sep. 9, 2003

(54) METHOD AND SYSTEM FOR ASSIGNING MULTIPLE DIRECTORY NUMBERS (DN) TO A PERSONAL COMMUNICATION SYSTEM (PCS) TELEPHONE

(75) Inventor: Nasir Ghafoor, Morrisville, NC (US)

(73) Assignee: Nortel Networks Limited, St. Laurent (CA)

(*) Notice: Subject to any disclaimer, the term of this patent is extended or adjusted under 35 U.S.C. 154(b) by 0 days.

(21) Appl. No.: 09/039,579

(22) Filed: Mar. 16, 1998

(51) Int. Cl.⁷ .............................. H04Q 7/20; H04Q 7/32
(52) U.S. Cl. .................... 455/419; 455/418; 455/461; 455/426; 455/550; 455/517
(58) Field of Search ..................... 455/404, 414, 455/419, 435, 552, 557, 418, 461, 426, 561, 517, 462, 550

(56) References Cited

U.S. PATENT DOCUMENTS

| | | | | |
|---|---|---|---|---|
| 5,371,781 A | * | 12/1994 | Ardon | 379/59 |
| 5,448,622 A | * | 9/1995 | Huttunen | 455/551 |
| 5,526,402 A | * | 6/1996 | Dent et al. | 455/426 |
| 5,544,235 A | * | 8/1996 | Ardon | 379/177 |
| 5,745,850 A | * | 4/1998 | Aldermeshian et al. | 455/517 |
| 5,745,852 A | * | 4/1998 | Khan et al. | 455/426 |
| 5,784,693 A | * | 7/1998 | Barber et al. | 455/434 |
| 5,918,172 A | * | 6/1999 | Saunders et al. | 455/404 |
| 5,983,095 A | * | 11/1999 | Cameron | 455/414 |
| 6,006,107 A | * | 12/1999 | Tomioka et al. | 455/552 |
| 6,119,001 A | * | 9/2000 | Delis et al. | 455/418 |

FOREIGN PATENT DOCUMENTS

| | | |
|---|---|---|
| EP | 0 435 052 A | 7/1991 |
| EP | 0 618 745 A | 10/1994 |
| EP | 0 813 347 A | 12/1997 |
| WO | 92 19078 A | 10/1992 |
| WO | 98 53629 A | 11/1998 |

* cited by examiner

Primary Examiner—William Trost
Assistant Examiner—Keith Ferguson
(74) Attorney, Agent, or Firm—Withrow & Terranova, PLLC (57) ABSTRACT

The present invention comprises methods and systems for activating in a switching system a directory number (DN) from among a plurality of directory numbers assigned to a PCS mobile telephone handset by de-activating the current active directory number, identifying an inactive directory number, and activating the inactive directory number. The present invention further comprises methods and systems for activating in a PCS mobile telephone handset a directory number from among a plurality of directory numbers assigned to the handset by de-activating the current active directory number, identifying an inactive directory number, and activating the inactive directory number. Specifically, a user can select a directory number for activation from among a plurality of directory numbers by either dialing a common directory number to access the home switching system for the desired directory number and entering the desired directory number from the handset or by placing the handset on a base unit that has the desired directory number.

34 Claims, 8 Drawing Sheets

METHOD AND SYSTEM FOR ASSIGNING MULTIPLE DIRECTORY NUMBERS (DN) TO A PERSONAL COMMUNICATION SYSTEM (PCS) TELEPHONE

TECHNICAL FIELD

The present invention relates to the field of personal communication systems (PCS), and more particularly, to a method and system for assigning multiple directory numbers (DNs) to a PCS mobile telephone handset.

BACKGROUND OF THE ART

A personal communication system (PCS) network assigns to a user a base unit, a mobile telephone handset, and a telephone number (also referred to as a directory number) associated with the base unit and the handset. The portability of the handset is a central feature of the PCS network, where the handset communicates with switching systems within the PCS network and/or its base unit via a wireless interface. Accordingly, the user can initiate calls from and receive calls on a directory number when the handset is away from its base unit.

One limitation of the current PCS networks is that a user cannot initiate calls from and receive calls on more than one directory number using a single handset. Existing PCS networks assign only one directory number to each base unit and handset pair. If the user wishes to subscribe to more directory numbers, the user would have to purchase an additional base unit and handset pair for each additional directory number.

With advances in PCS technology and declining service and equipment costs, the number of users in PCS networks is increasing rapidly. Further increases are expected as the cost of placing and receiving calls in PCS networks decreases and approaches those of traditional wireline systems. With an increasing user base, the number of PCS network users who would have a need to subscribe to multiple directory numbers, for example one for home and one for the office, is increasing as well.

Existing PCS networks, however, are not designed to meet this increased demand for multiple directory numbers. As each user subscribes to more than one directory number, the advantages associated with the PCS networks, i.e., mobility of services, become less attractive to users because each user would have to carry or have access to multiple handsets in order to initiate calls from and receive calls on the directory numbers. Furthermore, the cost of purchasing an additional handset for each additional directory number can make subscribing to additional directory numbers economically less attractive to users.

Therefore, it is desirable to have a method and system for assigning a plurality of directory numbers to a single mobile telephone handset in a PCS network. Accordingly, a user would be able to initiate calls from and receive calls on a plurality of directory numbers using a single handset.

DISCLOSURE OF THE INVENTION

The present invention comprises a method and a system for activating a directory number (DN) in a switching system from among a plurality of directory numbers assigned to a PCS mobile telephone handset by de-activating the current active directory number in the switching system, identifying an inactive directory number assigned to the handset, and activating the inactive directory number in the switching system. When a directory number is active, the handset can initiate calls from and receive calls on the directory number. However, the handset cannot initiate calls from and receive calls on an inactive directory number. In case of a call made to an inactive directory number, the switching system may direct the call to, for example, an automated voice mail module in the switching system.

The present invention further comprises a method and a system for activating a directory number in a PCS mobile telephone handset from among a plurality of directory numbers assigned to the handset by de-activating the current active directory number in the handset, selecting an inactive directory number in the handset, and activating the selected inactive directory number. Specifically, a user can select a directory number for activation by, for example, dialing a common directory number to access the home switching system corresponding to the desired directory number and entering the desired directory number from the handset. Alternatively, the user can select a directory number for activation by placing the handset on a base unit that has the desired directory number. After the user places the handset on the base unit, the handset activates the directory number corresponding to that of the base unit.

Numerous advantages accrue to methods and systems consistent with the present invention. For example, a user may initiate calls from and receive calls on a plurality of directory numbers using a single handset. Accordingly, the user can take better advantage of the mobility of the services provided by a PCS network. Furthermore, since the user is not required to purchase an additional handset for each additional directory number, the cost of subscribing to multiple directory numbers can be reduced.

The above desires, other desires, features, and advantages of the present invention will be readily appreciated by one of ordinary skill in the art from the following detailed description of the preferred implementations when taken in connection with the accompanying drawings.

BEST MODE FOR CARRYING OUT THE INVENTION

Reference will now be made in detail to embodiments consistent with the invention that are illustrated in the accompanying drawings. Where appropriate, the same reference numbers in different drawings generally refer to the same or like parts. For the sake of clarity in describing the methods and systems of the present invention, some components and functions that are not concerned with assignment, activation, and/or de-activation of a directory number (DN), and thus are unnecessary for understanding the present invention, are omitted from this description.

Generally methods and a systems consistent with the present invention activate a directory number in a switching system from among a plurality of directory numbers assigned to a PCS mobile telephone handset by de-activating the current active directory number, identifying an inactive directory number, and activating the inactive directory number. When a directory number is active, the handset can initiate calls from and receive calls on that directory number. However, when a directory number is inactive, the handset cannot initiate calls from and receive calls on the directory number. If a call is made to an inactive directory number, the switching system may direct the calls to, for example, an automated voice mail module in the switching system.

Furthermore, methods and systems consistent with the present invention generally activate a directory number in a PCS mobile telephone handset from among a plurality of directory numbers assigned to the handset by de-activating the current active directory number, identifying an inactive directory number, and activating the inactive directory number. Specifically, a user can select a directory number for activation from among a plurality of directory numbers by, for example, dialing a common directory number to access the home switching system for the desired directory number and entering the desired directory number from the handset. Alternatively, the user can select a directory number for activation by placing the handset on a base unit that has the desired directory number.

Figure 1:
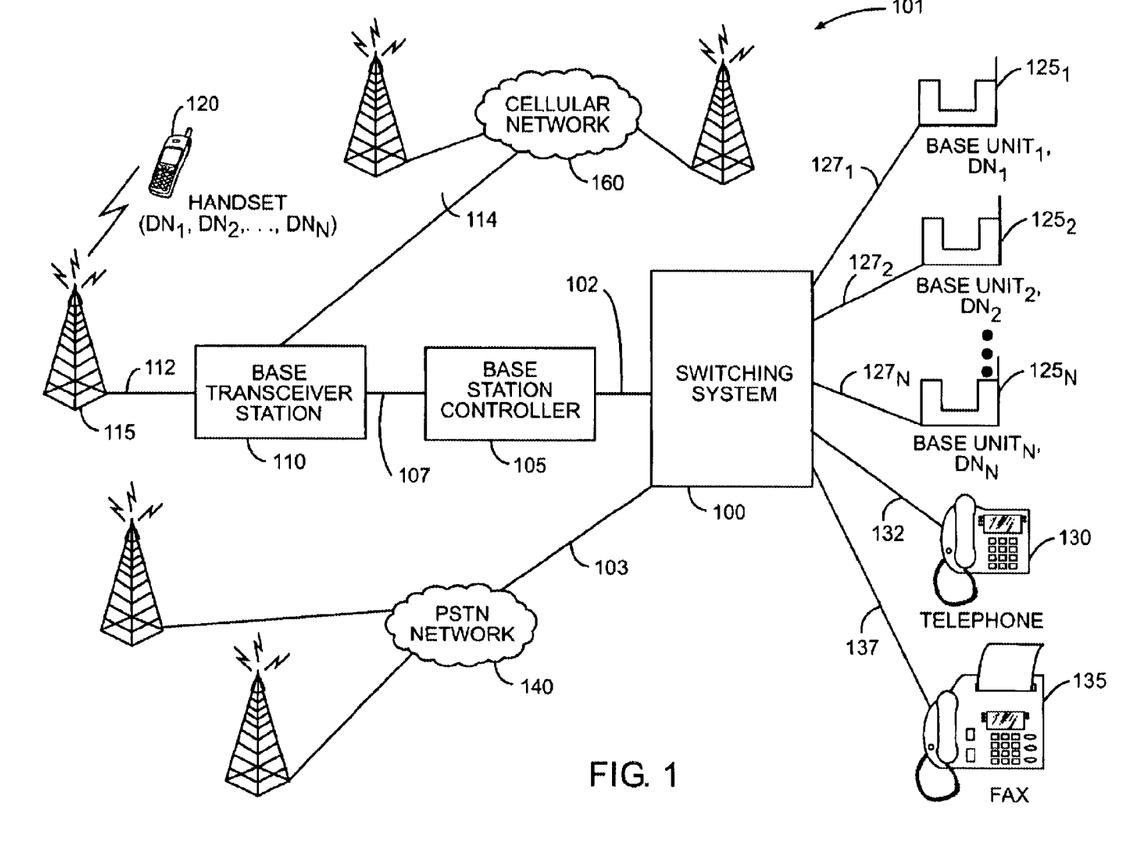
FIG. 1 illustrates a communications network that includes a plurality of PCS base units assigned to a switching system consistent with the present invention.

FIG. 1 illustrates a communications network that includes switching system 100, PCS base units $125_1$ through $125_N$, and PCS mobile telephone handset 120 consistent with the present invention. Switching system 100 interfaces with base units $125_1$ through $125_N$ via local loops $127_1$ through $127_N$, respectively. A network administrator provisions directory numbers $DN_1$ through $DN_N$ in switching system 100, and assigns directory numbers $DN_1$ through $DN_N$ to local loops $125_1$ through $125_N$, respectively.

Switching system 100 also interfaces with base station controller (BSC) 105 via link 102, which, for example, includes a plurality of T1 trunks. BSC 105 provides data routing and voice coding, and interfaces with base transceiver station (BTS) 110 via link 107. BTS 110 provides a wireless interface to mobile telephone handset 120 via cable 112 and antenna 115. Furthermore, BTS 110 interfaces with cellular network 160 via link 114.

Handset 120 is a standard PCS handset, which communicates with switching system 100 via antenna 115 using, for example, a standard wireless communication protocol specified in "International Standard 41D," International Telecommunication Union (ITU-IS41D). The network administrator configures handset 120 to initiate calls from and receive calls on directory numbers $DN_1$ through $DN_N$. Accordingly, handset 120 can initiate and receives calls by activating any one of directory numbers $DN_1$ through $DN_N$, with one directory number generally being active at any given time. Furthermore, handset 120 can communicate with any one of base units $125_1$ through $125_N$ using, for example, a standard wireless protocol specified in ITU-IS41D when handset 120 is in communication range with each base unit.

As shown in FIG. 1, switching system 100 also interfaces with telephone set 130 and facsimile machine 135 via local loops 132 and 137, respectively. Switching system 100 also interfaces with public switched telephone network (PSTN) 140 via link 103.

Figure 2:
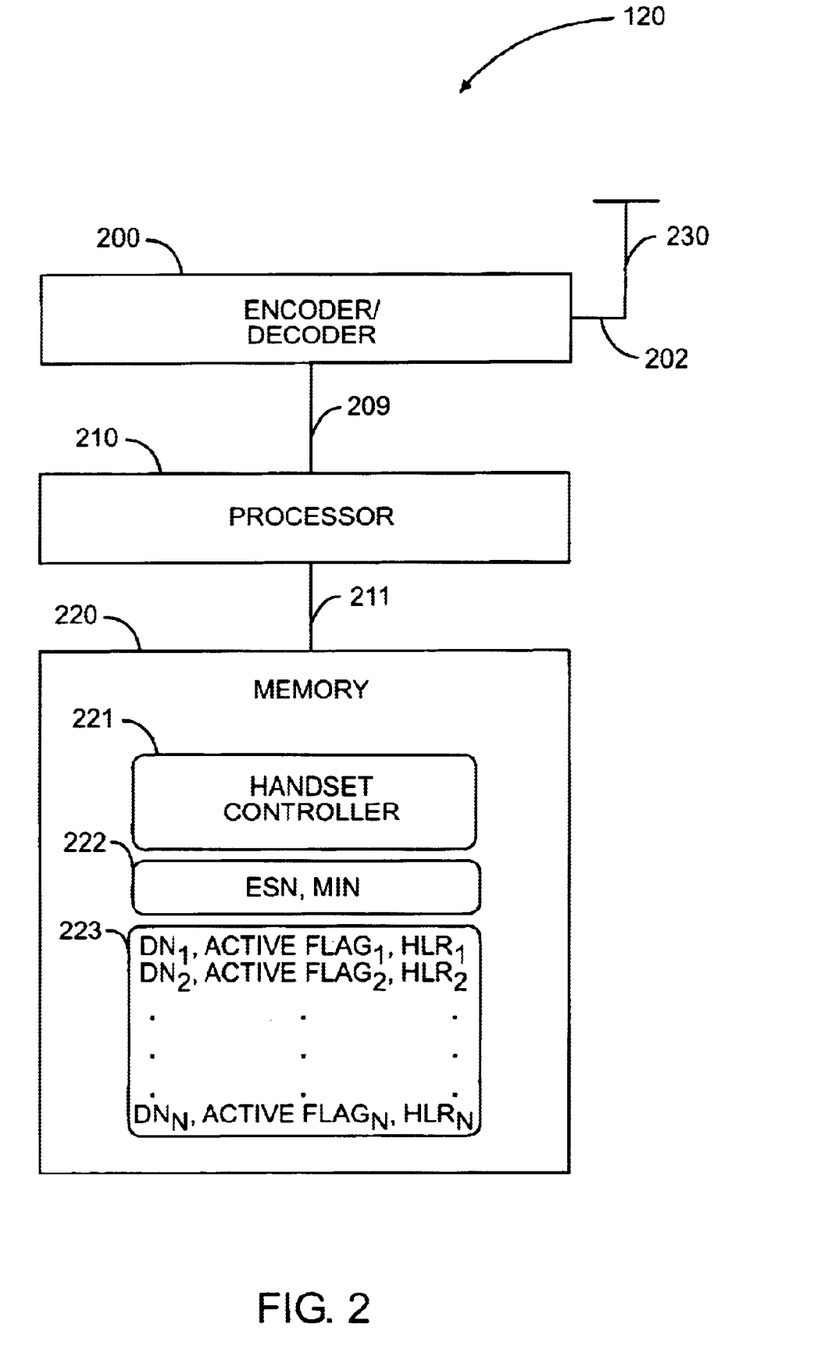
FIG. 2 is a block diagram of a mobile telephone handset consistent with the present invention.

FIG. 2 is a block diagram of a PCS handset, for example handset 120 of FIG. 1, consistent with the present invention. As shown, handset 120 includes processor 210, memory unit 220, encoder/decoder 200, and antenna 230. Processor 210 interfaces with memory unit 220 and encoder/decoder 200 via buses 211 and 209, respectively. Encoder/decoder 200, which interfaces with antenna 230 via bus 202, encodes digitized information from processor 210, and transmits the information via antenna 230 using a standard wireless communication protocol. Likewise, encoder/decoder 200 decodes coded information received via antenna 230, and sends the decoded information to processor 210.

Memory unit 220 includes handset controller module (HANDSET) 221, handset identifier 222, and DN array 223. HANDSET 221 includes a set of instructions in the form of executable software, which processor 210 executes. Alternatively, any portion or all of HANDSET 221 can be implemented with firmware and/or hardware technologies known to one of ordinary skill in the art. Handset identifier 222 includes an Electronic Serial Number (ESN) and a Mobile Identification Number (MIN) stored in static memory. ESN is an identifier, which includes a unique manufacturer's number and a serial number. MIN is a network generated identifier, which uniquely identifies handset 120 in communications network 101.

With continuing reference to FIG. 2, DN array 223 includes a set of N directory numbers $DN_1$ through $DN_N$ and their respective Active Flags and Home Location Register fields (HLR). In one embodiment, each Active Flag is a one bit boolean and indicates whether its respective directory number is active. A bit value of 1 for an Active Flag represents that its respective directory number is active, and a bit value of 0 represents that a directory number is inactive. Each HLR includes a MIN, ESN, and a mobile serving region identifier (MSR). An MSR represents a geographical area where handset 120 can receive service associated with a directory number from communications network 101.

Figure 3:
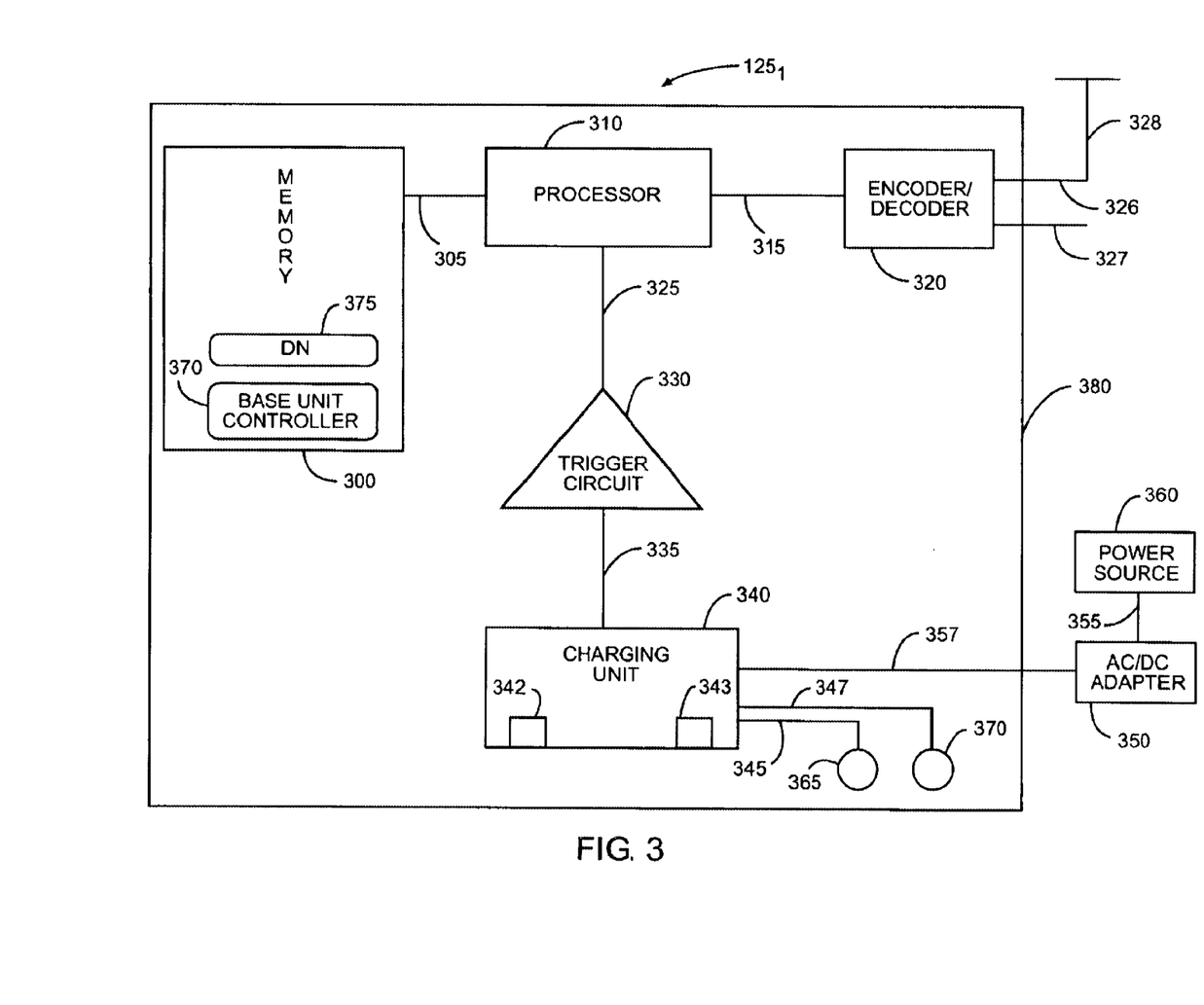
FIG. 3 is a block diagram of a base unit for a mobile telephone handset consistent with the present invention.

FIG. 3 is a block diagram of a base unit, for example base unit $125_1$ of FIG. 1, consistent with the present invention. Base unit $125_1$ is a standard PCS base unit, and includes frame 380, processor 310, memory unit 300, trigger circuit 330, charging unit 340, encoder/decoder 320, antenna 328, in-use indicator 365, charging indicator 370, and AC/DC adapter 350. Processor 310 interfaces with memory unit 300 and encoder/decoder 320 via buses 305 and 315, respectively, and interfaces with trigger circuit 330 via line 325. Memory unit 300 includes base unit controller (BASE UNIT) 370 and directory number (DN) 375. BASE UNIT 370 includes a set of instructions in the form of software, which processor 310 executes. Alternatively, any portion or all of BASE UNIT 370 may be implemented using firmware and/or hardware technologies known to one of ordinary skill in the art. DN 375 is a numeric string representing the directory number assigned to base unit 1251 and may be stored in static memory.

Encoder/decoder 320 has two input/output lines 326 and 327. Input/output line 326 connects to antenna 328, and input/output line 327 connects to a switching system, such as, switching system 100 of FIG. 1. Encoder/decoder 320 encodes digitized information from processor 310, and transmits the information via input/output line 326 to antenna 328. Likewise, when encoder/decoder 320 receives coded information via antenna 328 and input/output line 326, encoder/decoder 320 decodes the coded information and sends the decoded information to processor 310 or to input/output line 327. Encoder/decoder 320 communicates with switching system 100 via input/output line 327 using a standard telephony wireline interface.

Trigger circuit 330 interfaces with charging unit 340 via line 335. Charging unit 340 interfaces with in-use indicator 365, charging indicator 370, and adapter 350 via lines 345, 347, and 357, respectively. Adapter 350 connects to power source 360 via wire cord 355.

Charging unit 340 includes charging contacts 342 and 343. When a user places handset 120 on base unit $125_1$, handset 120 contacts charging contacts 342 and 343. As a result of the contact, charging unit 340 generates two pulses, one enabling trigger circuit 330 and the other enabling in-use indicator 365. Trigger circuit 330 in turn generates a pulse and sends it to processor 310. Processor 310 executes the software of BASE UNIT 370, sending DN 375 to encoder/decoder 320. Encoder/decoder encodes DN 375 and sends the encoded DN 375 via antenna 328 to handset 120.

Figure 4:
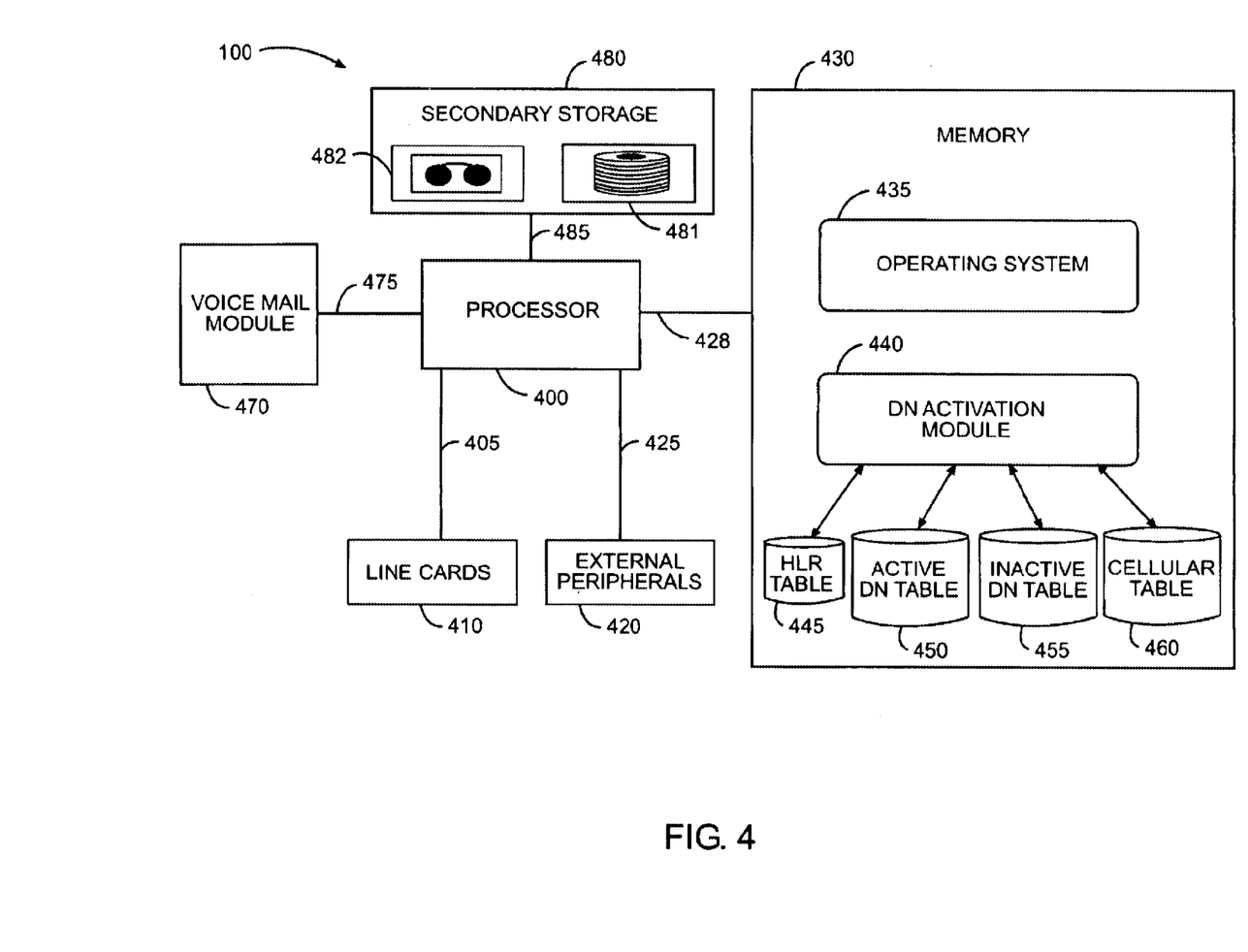
FIG. 4 is a block diagram of a switching system consistent with the present invention.

FIG. 4 illustrates a block diagram of a switching system, for example switching system 100, consistent with the present invention. Switching system 100 includes processor 400, line cards 410, external peripherals 420, memory unit 430, voice mail module 470, and secondary storage 480. Processor 400 interfaces with memory unit 430, line cards 410, external peripherals 420, voice mail module 470, and secondary storage 480 via buses 428, 405, 425, 475, and 485, respectively.

Memory unit 430 includes operating system 435, DN activation module (DN_ACT) 440, HLR table 445, Active DN table 450, Inactive DN table 455, and Cellular table 460. Operating system 435 and DN_ACT 440 each include a set of instructions in form of software, which processor 400 executes. Some of the functions of operating system 435 includes scheduling and management of resources in switching system 100.

Upon receipt of a request from a handset, for example handset 120, to activate a directory number, DN_ACT 440 processes the request and activates the requested directory number by using HLR table 445, Active DN table 450, Inactive DN table 455, and Cellular table 460. HLR table 445 includes a record for each handset that subscribes to one or more directory numbers. Each record may include a MIN, ESN, and an MSR field for each handset, where, for example, MIN is a key to HLR table 445.

Active DN table 450 includes a record for each active directory number in switching system 100. Each record may include a MIN and a directory number field. When a directory number is active in switching system 100, handset 120 can initiate calls from and receive calls on the active directory number.

Inactive DN table 455 includes a record for each directory number that is inactive in switching system 100. Like Active DN table 450, each record may include a MIN and a DN field. When a directory number is inactive in switching system 100, handset 120 cannot initiate and receives calls on the directory number. In case of a user making calls to an inactive directory number, switching system 100 can direct the calls to, for example, voice mail module 470. Alternatively, switching system 100 can announce a message to the user attempting the call that the particular DN is inactive. The particular method used in a switching system to handle calls made to an inactive directory number can vary from switching system to switching system, and is not essential for practicing the present invention.

A network administrator provisions directory numbers $DN_1$ through $DN_N$ in switching system 100 by adding a record in Cellular table 460. A record in cellular table 460 includes a MIN field and a field for each directory number $DN_1$ through $DN_N$ assigned to the MIN.

Switching system 100 also includes secondary storage 480. Secondary storage 480 includes disk drive unit 481 and tape drive 482, which upload and/or download switching system software and data. Processor 400 downloads software and data to disk drive unit 481, which can copy the downloaded software and data to tape drive unit 482. Similarly, tape drive unit 482 can copy software and data to disk drive unit 481, which can then upload the date to processor 400.

Line cards 410 interface with user equipment, for example, base units $125_1$ through $125_N$, telephone 130, and facsimile machine 135 (shown in FIG. 1). External peripherals 420 interface with other switching systems or other networks, for example, PSTN network 140 via T3 trunk 103 (shown in FIG. 1).

Figure 5:
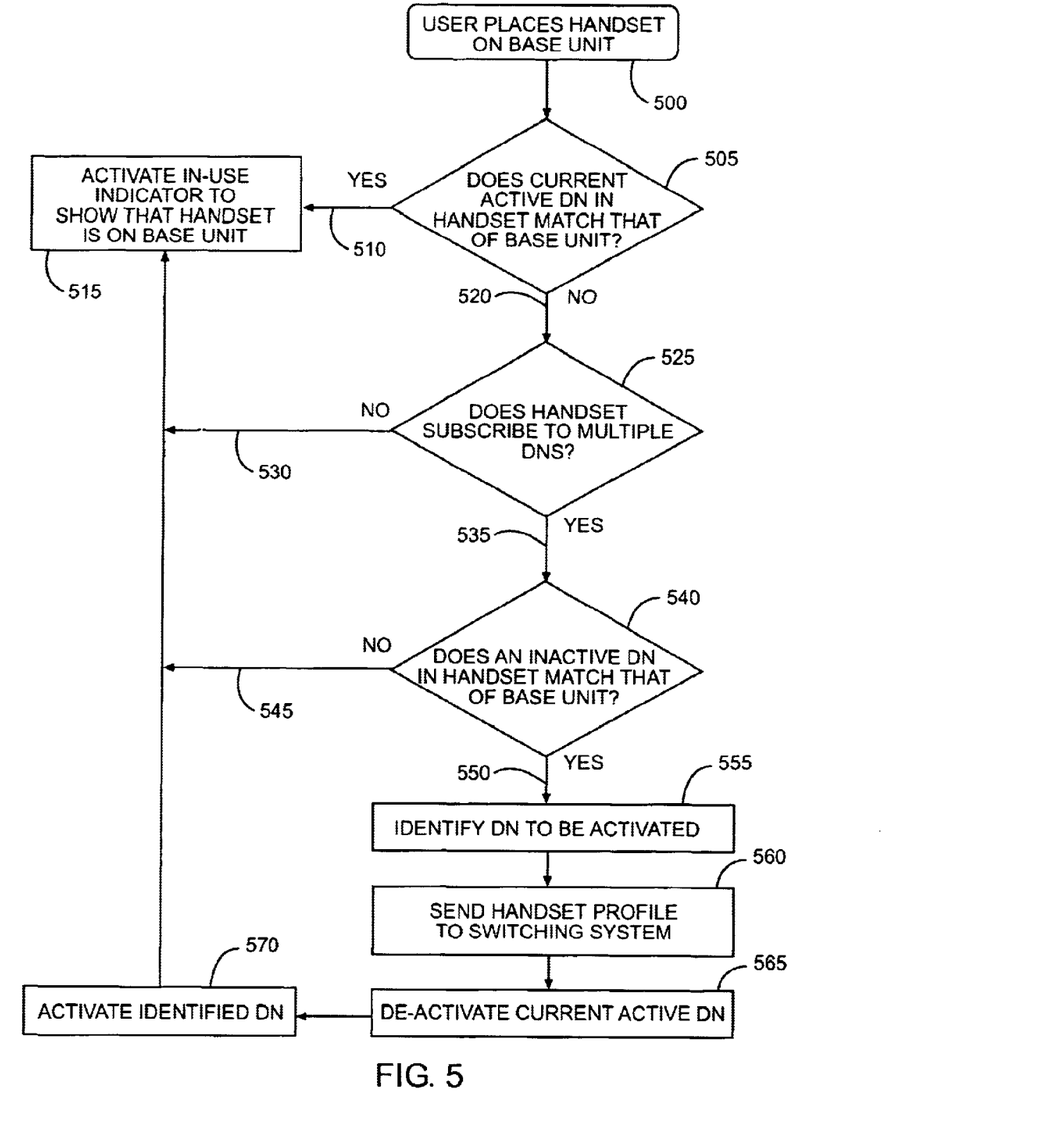
FIG. 5 is a flow chart of the steps that a mobile telephone handset performs when a user places the handset on a base unit consistent with the present invention.

FIG. 5 is a flow chart of the steps that HANDSET 221 may perform, consistent with the present invention, when a user places handset 120 on base unit $125_1$. When a user places handset 129 on base unit $125_1$ (step 500), HANDSET 221 determines whether the current active directory number in handset 120 matches the directory number in base unit $125_1$ (step 505). If the current active directory number in handset 120 matches the directory number in base unit $125_1$ (step 510), HANDSET 221 activates in-use indicator 365 in base unit $125_1$ (step 515). If the current active directory number in handset 120 does not match the directory number in base unit $125_1$ (step 520), HANDSET 221 then determines whether handset 120 subscribes to multiple directory numbers (step 525). If handset 120 does not subscribe to multiple directory numbers (step 530), HANDSET 221 activates in-use indicator 365 in base unit $125_1$ (step 515).

If handset 120 subscribes to multiple directory numbers (step 535), then HANDSET 221 determines whether an inactive directory number in handset 120 matches the directory number of base unit $125_1$ (step 540). If an inactive directory number in handset 120 does not match the directory number in base unit $125_1$ (step 545), HANDSET 221 then activates in-use indicator 365 in base unit $125_1$ (step 515). If an inactive directory number in handset 120 matches the directory number in the base unit $125_1$ (step 550), HANDSET 221 selects the inactive directory number for activation in handset 120 (step 555). HANDSET 221 then sends the profile of handset 120 to its home switching system, for example, switching system 100 (step 560). The profile may include the active directory number, the selected inactive directory number, MIN, ESN, and the HLR associated with the selected inactive directory number.

When HANDSET 221 receives an authorization from switching system 100, HANDSET 221 de-activates the active directory number by setting the Active Flag bit for the active directory number to 0 (step 565). HANDSET 221 then activates the selected inactive directory number by setting the Active Flag bit for the inactive directory number to 1 (step 570). HANDSET 221 then activates in-use indicator 365 in base unit $125_1$ (step 515).

Figure 6:
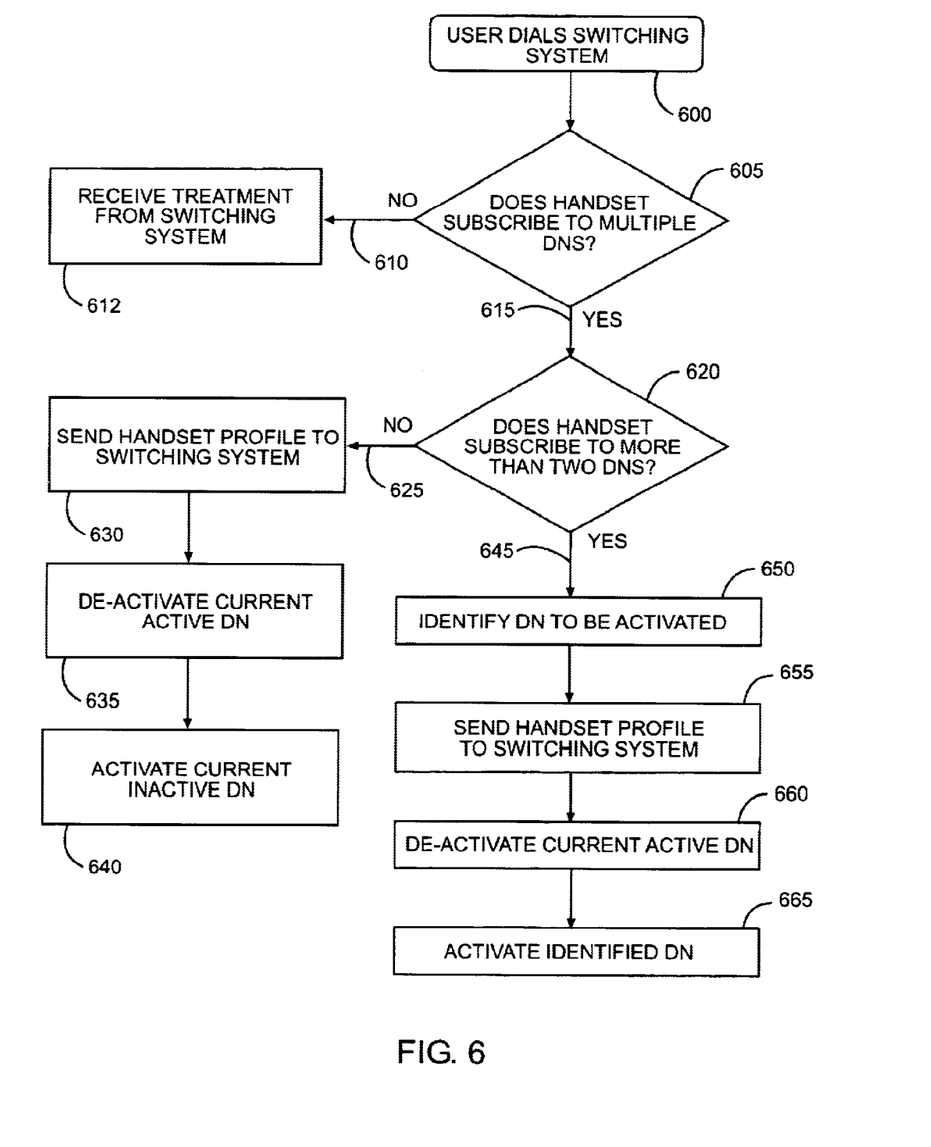
FIG. 6 is a flow chart of the steps that a mobile telephone handset performs when a user activates a directory number in the handset consistent with the present invention.

FIG. 6 is a flow chart of the steps that HANDSET 221 may perform, consistent with the present invention, when a user wishes to activate a directory number while handset 120 is away from a base unit. As shown, the user dials the home switching system of handset 120, for example, switching system 100 (step 600). Alternatively, the user can dial an 800 directory number which identifies and transfers the call to the home switching system of handset 120. HANDSET 221 determines whether handset 120 subscribes to multiple DNs (step 605). If handset 120 does not subscribe to multiple DNs (step 610), HANDSET 221 waits to receive a treatment from switching system 100 indicating to the user that handset 120 cannot activate a different directory number (step 612).

If handset 120 subscribes to multiple directory numbers (step 615), HANDSET 221 determines whether handset 120 subscribes to more than two directory numbers (step 620). If handset 120 subscribes to two directory numbers (step 625), HANDSET 221 selects the current inactive directory number for activation and sends the profile of handset 120 to switching system 100 (step 630). As explained above, the profile may include the active directory number, the selected inactive directory number, MIN, ESN, and HLR associated with the selected inactive directory number. Upon receipt of an authorization from switching system 100, HANDSET 221 de-activates the current active directory number in handset 120 by setting in DN array 223 the Active Flag bit for the active directory number to 0 (step 635) and activates the current inactive directory number by setting the Active Flag bit for the inactive directory number in DN array 223 to 1 (step 640).

If handset 120 subscribes to more than two directory numbers (step 645), HANDSET 221 identifies a directory number for activation by, for example, prompting the user to dial a desired directory number (step 650). HANDSET 221 then sends the profile of handset 120, which may include the current active directory number, dialed inactive directory number, MIN, ESN, and the HLR associated with the dialed inactive directory number, to switching system 100 and waits for an authorization from switching system 100 (step 655). When HANDSET 221 receives an authorization from switching system 100, HANDSET 221 de-activates the current active directory number in handset 120 by setting the Active Flag bit for the active directory number in DN array 223 to 0 (step 660). HANDSET 221 then activates the directory number that the user dialed by setting the Active Flag bit for the inactive directory number to 1 (step 665).

Figure 7:
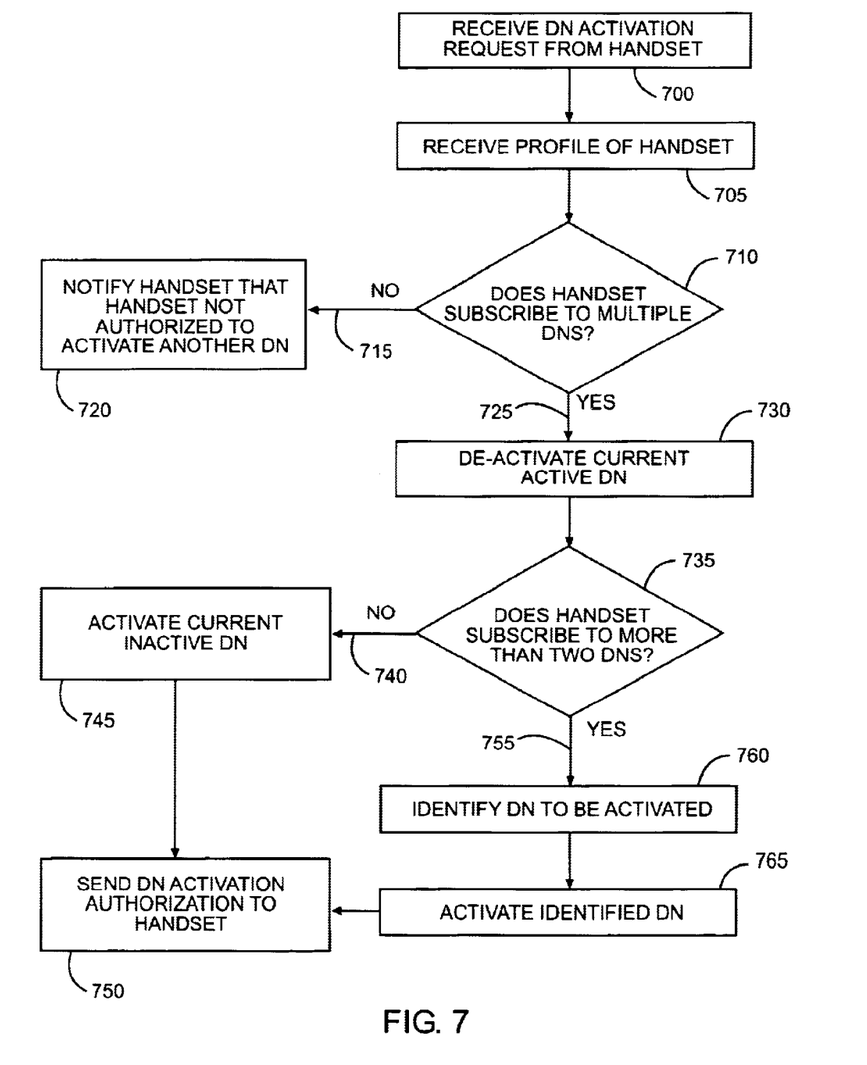
FIG. 7 is a flow chart of the steps that a switching system performs when a user activates a directory number in a mobile telephone handset consistent with the present invention.

FIG. 7 is a flow chart of the steps that a switching system consistent with the present invention, may perform to activate a directory number in the switching system. In switching system 100, DN_ACT 440 receives a directory number activation request from handset 120 (step 700) and a profile from handset 120 (step 705). As explained above, the profile may include the current active directory number, an inactive directory number to be activated, MIN, ESN, and the HLR associated with the inactive directory number. DN_ACT 440 reads HLR table 445 and determines whether the HLR in the profile matches that of HLR table 445. Furthermore, DN_ACT 440 determines whether the MIN and ESN in the profile match the MIN and ESN fields in HLR table 445.

DN_ACT 440 then determines whether handset 120 subscribes to multiple directory numbers (step 710). Using the MIN in the profile as a key, for example, DN_ACT 440 reads Cellular table 460 to determine whether multiple directory numbers are assigned to the MIN and whether the directory number that handset 120 requests to be activated is among the directory numbers assigned to the MIN. If handset 120 does not subscribe to multiple directory numbers or the requested directory number is not among the directory numbers assigned to handset 120 (step 715), DN_ACT 440 notifies handset 120 that handset 120 is not authorized to activate the requested directory number (step 720).

If handset 120 subscribes to multiple directory numbers (step 725), DN_ACT 440 deactivates the current active directory number. This can be done, for example, by deleting the directory number and its corresponding MIN from Active DN table 450. Next, DN_ACT 440 determines whether handset 120 subscribes to more than two directory numbers (step 735). If handset 120 subscribes to two directory numbers (step 740), DN_ACT 440 activates the current inactive directory number assigned to handset 120 by, for example, adding the inactive directory number and its corresponding MIN to Active DN table 450 and deleting the inactive directory number from Inactive DN table 455 (step 745). DN_ACT 440 then sends a message to handset 120 authorizing it to activate the inactive directory number in handset 120 (step 750).

If handset 120 subscribes to more than two directory numbers (step 755), DN_ACT 440 identifies the inactive directory number to be activated from, for example, the profile received from handset 120 (step 760). DN_ACT 440 activates the identified inactive directory number by, for example, adding the inactive directory number and its corresponding MIN to Active DN table 450 and deleting the inactive directory number from Inactive DN table 455 (step 765). DN_ACT then sends a directory number activation authorization to handset 120 (step 750) and registers the newly activated directory number according to, for example, the PCS industry standards specified in "International Standard 95," International Telecommunication Union (ITU-IS95).

Figure 8:
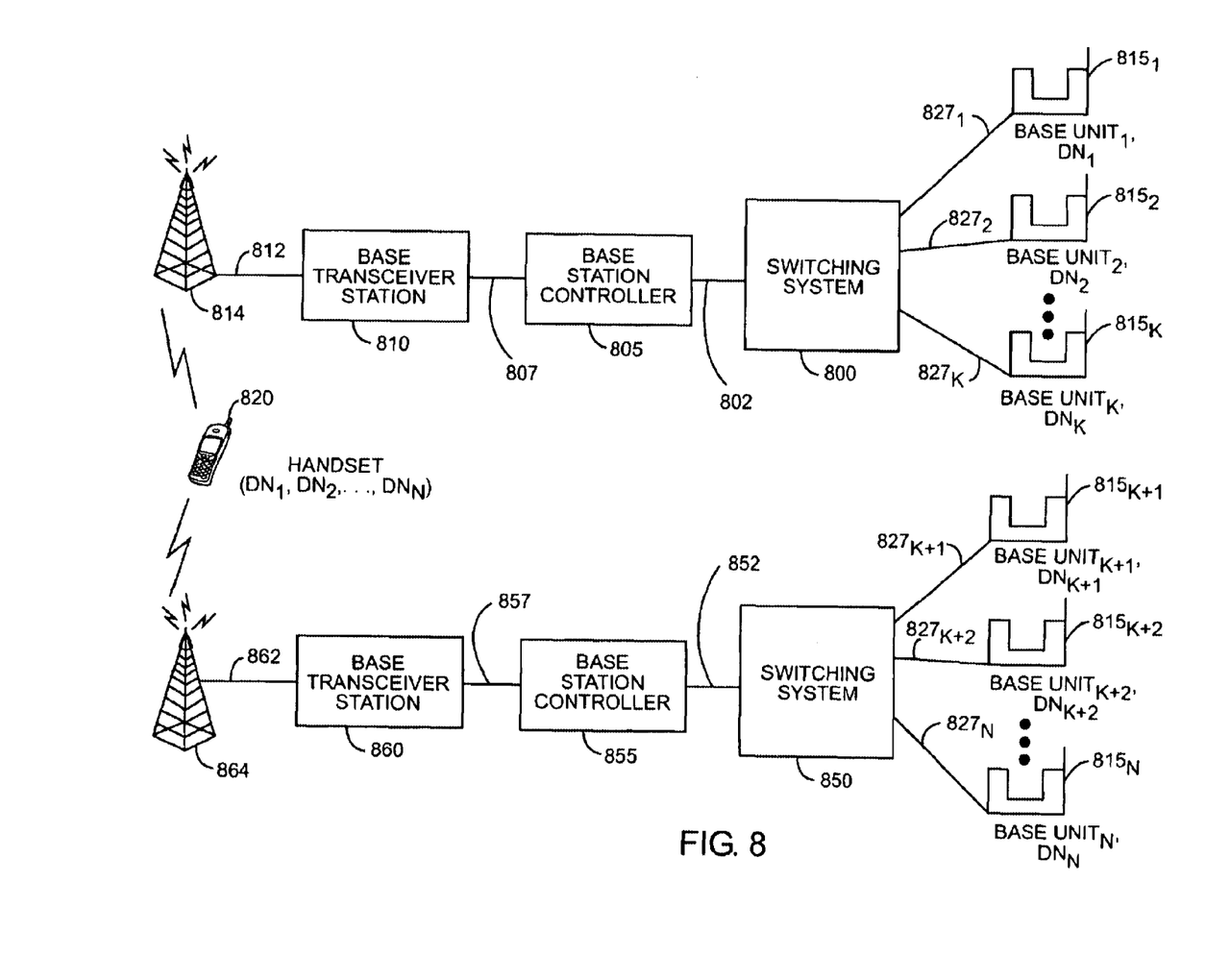
FIG. 8 illustrates a communications network that includes a plurality of PCS base units assigned to a plurality of switching systems consistent with the present invention.

FIG. 8 illustrates another embodiment of a PCS communications network consistent with the present invention. As shown, switching system 800 is the home switching system for K PCS base units $815_1$ through $815_K$, which interface with switching system 800 via local loops $827_1$ through $827_K$, respectively. Switching system 850 is the home switching system for M PCS base units $815_{K+1}$ through $815_N$, which interface with switching system 850 via local loops $827_{K+1}$ through $827_N$, respectively.

A network administrator provisions directory numbers $DN_1$ through $DN_K$ in switching system 800, and provisions directory numbers $DN_{K+1}$ through $DN_N$ in switching system 850. The administrator assigns directory numbers $DN_1$ through $DN_K$ to local loops $827_1$ through $827_K$, respectively, and assigns directory numbers $DN_{K+1}$ through $DN_N$ to local loops $827_{K+1}$ through $827_N$, respectively. The administrator sets up an HLR table, Active DN table, Inactive DN table, and Cellular table in each switching system 800 and 850 in the same manner as the embodiment disclosed in FIG. 4.

Switching system 800 interfaces with base station controller (BSC) 805 via link 802, which, for example, includes a plurality of T1 trunks. BSC 805 provides data routing and voice coding, and interfaces with base transceiver station (BTS) 810 via link 807. BTS 810 provides a wireless interface to mobile telephone handset 820 via cable 812 and antenna 814, Similarly, switching system 850 interfaces with base station controller (BSC) 855 via link 852, which, for example, includes a plurality of T1 trunks. BSC 855 provides data routing and voice coding, and interfaces with base transceiver subsystem (BTS) 860 via link 857. BTS 860 provides a wireless interface to mobile telephone handset 820 via cable 862 and antenna 864.

PCS mobile telephone handset 820 communicates with switching systems 800 and 850 via a wireless interface with antennas 814 and 864. The network administrator configures handset 820 with directory numbers $DN_1$ through $DN_N$. Accordingly, handset 820 can initiate and receives calls by activating any one of directory numbers $DN_1$ through $DN_N$. Specifically, handset 820 can have one directory number active at a time. Furthermore, handset 820 can communicate with any one of base units $815_1$ through $815_K$ and base units $815_{K+1}$ through $815_N$ via air interface when handset 820 is in communication range.

Consistent with the present invention, when a user places handset 820 on any one of base units $815_1$ through $815_N$, handset 820 and base units $815_1$ through $815_N$ operate in the manner as set forth in flow charts of FIGS. 5 and 6 to activate a desired directory number in handset 820. Likewise, switching systems 800 and 850 operate in the manner as set forth in flow chart of FIG. 7 to activate and inactivate a directory number in each switching system consistent with the present invention.

Those skilled in the art will recognize that various modifications and variations can be made in the preceding examples without departing from the scope or spirit of the invention. The specification does not limit the invention. Instead, it provides examples and explanations to allow persons of ordinary skill to appreciate different ways to practice this invention. The following claims define the true scope and spirit of the invention.

What is claimed:

1. A method, for use in a switching system, for activating one of a plurality of directory numbers (DNs) assigned to a mobile telephone handset, said method comprising the steps of:
    a) de-activating at a switch an active one of the plurality of directory numbers assigned to a handset;
    b) identifying an inactive one of the plurality of directory numbers; and
    c) activating at a switch an identified inactive directory number.

2. The method according to claim 1, wherein the identifying step further comprises the step of:
    d) receiving an inactive one of the plurality of directory numbers.

3. The method according to claim 1, wherein the identifying step further comprises the step of:
    e) determining whether the plurality of directory numbers are assigned to the handset.

4. The method according to claim 1, wherein the identifying step further comprises the step of:
    f) identifying current inactive directory number when the plurality of directory numbers assigned to the handset are two.

5. The method according to claim 1, wherein the activating step further comprises the step of:
    g) activating current inactive directory number when the plurality of directory numbers assigned to the handset are two.

6. A method, for use in a mobile telephone handset, for activating one of a plurality of directory numbers (DNs) assigned to the handset, the method comprising the steps of:
    a) de-activating at a switch an active one of the plurality of directory numbers assigned to a handset;
    b) identifying an inactive one of the plurality of directory numbers; and
    c) activating at a switch the identified inactive directory number.

7. The method according to claim 6, wherein the identifying step further comprises the step of:
    d) dialing an inactive one of the plurality of directory numbers.

8. The method according to claim 7, wherein the identifying step further comprises the step of:
    f) transmitting the dialed inactive directory number.

9. The method according to claim 6, wherein the identifying step further comprises the step of:
    e) placing the handset on a base unit.

10. The method according to claim 9, wherein the identifying step further comprises the step of:
    a) identifying a directory number assigned to the base unit.

11. A system, for use in a switching system, for activating one of a plurality of directory numbers (DNs) assigned to a mobile telephone handset, comprising:
    a) means for de-activating at a switch an active one of the plurality of directory numbers assigned to a handset;
    b) means for identifying an inactive one of the plurality of directory numbers; and
    c) means for activating at a switch the identified inactive directory number.

12. The system according to claim 11, wherein the identifying means further comprises:
    d) means for determining at a switch whether the plurality of directory numbers are assigned to the handset.

13. The system according to claim 11, wherein the identifying means further comprises:
    e) means for identifying current inactive directory number when the plurality of directory numbers assigned to the handset are two.

14. The method according to claim 11, wherein the activating means further comprises:
    f) means for activating current inactive directory number when the plurality of directory numbers assigned to the handset are two.

15. A system, for use with a mobile telephone handset, for activating one of a plurality of directory numbers (DNs) assigned to the handset, comprising:
    a) means for de-activating at a switch an active one of the plurality of directory numbers;
    b) means for identifying an inactive one of the plurality of directory numbers; and
    c) means for activating at a switch said identified inactive directory number.

16. The system according to claim 15, wherein the identifying means further comprises:
    d) means for dialing an inactive one of the plurality of directory numbers.

17. The system according to claim 16, wherein the identifying means further comprises:
    e) means for transmitting the dialed inactive directory number.

18. The system according to claim 17, wherein the identifying means further comprises:
    f) means for identifying a directory number assigned to a base unit.

19. A computer-readable medium capable of configuring a switching system to perform a method for activating in the switching system one of a plurality of directory numbers (DNs) assigned to a mobile telephone handset, the method comprising the steps of:
    a) de-activating at a switch an active one of the plurality of directory numbers;
    b) identifying an inactive one of the plurality of directory numbers; and
    c) activating at a switch the identified inactive directory number.

20. The computer-readable medium according to claim 19, wherein the identifying step further comprises the step of:

d) receiving an inactive one of the plurality of directory numbers.

21. The computer-readable medium according to claim 19, wherein the identifying step further comprises the step of:

e) determining whether the plurality of directory numbers are assigned to the handset.

22. The computer-readable medium according to claim 19, wherein the identifying step further comprises the step of:

f) identifying current inactive directory number when the plurality of directory numbers assigned to the handset are two.

23. The computer-readable medium according to claim 19, wherein the activating step further comprises the step of:

g) activating current inactive directory number when the plurality of directory numbers assigned to the handset are two.

24. A computer-readable medium capable of configuring from a switch a mobile telephone handset to perform a method for activating in a handset one of a plurality of directory numbers (DNs) assigned to the handset, the method comprising the steps of:

a) de-activating at a switch an active one of the plurality of directory numbers;

b) identifying an inactive one of the plurality of directory numbers; and c) activating at a switch the identified inactive directory number.

25. The computer-readable medium according to claim 24, wherein the identifying step further comprises the step of:

d) dialing an inactive one of the plurality of directory numbers.

26. The computer-readable medium according to claim 25, wherein the identifying step further comprises the step of:

f) transmitting the dialed inactive directory number.

27. The computer-readable medium according to claim 24, wherein the identifying step further comprises the step of:

e) placing the handset on a base unit.

28. The computer-readable medium according to claim 27, wherein said identifying step further comprises the step of:

g) identifying a directory number assigned to the base unit.

29. A personal communication system (PCS) network, comprising:

a) a first switching system interfacing a second switching system, wherein the first switching system including:
      means for de-activating at a switch an active one of a plurality of directory numbers assigned to a mobile telephone handset;
      means for identifying an inactive one of the plurality of directory numbers; and
      means for activating at a switch the identified inactive directory number.

30. A personal communication system (PCS) mobile telephone handset, comprising:

a) a memory comprising:
      a handset controller program adapted to de-activate at a switch an active one of a plurality of directory numbers (DNs) assigned to the handset and adapted to activate at a switch an inactive one of the plurality of directory numbers; and b) a processor for running the handset controller program.

31. The personal communication system (PCS) mobile telephone handset according to claim 30, wherein the handset controller program identifies a directory number assigned to a base unit.

32. The personal communication system (PCS) mobile telephone handset according to claim 30, further comprises:

c) a keypad for dialing an inactive one of the plurality of directory numbers.

33. The personal communication system (PCS) mobile telephone handset according to claim 32, further comprises:

d) a transmitter for transmitting the dialed inactive directory number.

34. A switching device having a data structure for assigning a plurality of directory numbers (DNs) to a personal communication system (PCS) mobile telephone handset, the data structure having a plurality of entries, each entry comprising:

a) one of the plurality of directory numbers;

b) an indicator for determining whether the directory number is active; and c) a home location register identifier.

* * * * *